(12) United States Patent
Monto

(10) Patent No.: US 9,371,818 B1
(45) Date of Patent: Jun. 21, 2016

(54) CYCLONIC AEOLIAN VORTEX TURBINE

(71) Applicant: Mark T. Monto, Studio City, CA (US)

(72) Inventor: Mark T. Monto, Studio City, CA (US)

(*) Notice: Subject to any disclaimer, the term of this patent is extended or adjusted under 35 U.S.C. 154(b) by 0 days.

(21) Appl. No.: 14/822,785

(22) Filed: Aug. 10, 2015

(51) Int. Cl.
   *F03D 3/04* (2006.01)

(52) U.S. Cl.
   CPC .............. *F03D 3/0427* (2013.01); *F03D 3/049* (2013.01); *F03D 3/0409* (2013.01); *F03D 3/0463* (2013.01)

(58) Field of Classification Search
   CPC ....... F03D 3/04; F03D 3/0427; F03D 3/0436; F03D 3/0409; F03D 3/0445; F03D 3/0454; F03D 3/0463; F03D 3/0472; F03D 3/0481; F03D 3/049
   See application file for complete search history.

(56) References Cited

U.S. PATENT DOCUMENTS

| | | | |
|---|---|---|---|
| 4,452,046 A | 6/1984 | Valentin | |
| 4,499,034 A * | 2/1985 | McAllister, Jr. | .......... F03D 9/00 261/109 |
| 4,609,827 A | 9/1986 | Nepple | |
| 5,852,331 A * | 12/1998 | Giorgini | .................... F03D 1/04 290/44 |
| 6,638,005 B2 | 10/2003 | Holter et al. | |
| 6,666,650 B1 | 12/2003 | Themel | |
| 7,211,905 B1 | 5/2007 | McDavid | |
| 7,288,850 B2 | 10/2007 | Hicks et al. | |
| 7,504,740 B2 | 3/2009 | Murakami et al. | |
| 7,605,491 B1 | 10/2009 | Chung | |
| 8,727,698 B1 | 5/2014 | Pickett et al. | |
| 8,734,084 B1 | 5/2014 | Lovas | |
| 2004/0100103 A1 | 5/2004 | Becherucci et al. | |
| 2004/0183310 A1 | 9/2004 | Mowll | |
| 2010/0148516 A1 | 6/2010 | Buhtz | |
| 2011/0011015 A1 * | 1/2011 | Halamka | ................... E04H 6/08 52/173.1 |
| 2011/0316279 A1 | 12/2011 | Bahari et al. | |
| 2012/0261918 A1 | 10/2012 | Hanback | |
| 2013/0307276 A1 | 11/2013 | Ko | |
| 2014/0064918 A1 * | 3/2014 | Hurup | ....................... F03B 3/16 415/4.1 |

FOREIGN PATENT DOCUMENTS

| | | |
|---|---|---|
| EP | 1681462 A2 | 7/2006 |
| JP | 54108145 A * | 8/1979 |

* cited by examiner

*Primary Examiner* — Dwayne J White
*Assistant Examiner* — Danielle M Christensen
(74) *Attorney, Agent, or Firm* — CIONCA Law Group P.C.; Marin Cionca

(57) ABSTRACT

A wind turbine is provided that has a blade encased into a substantially circular portion of a shell, the shell having an interior surface, an exterior surface, a first end, an opposite second end, and an intake opening between the first and the second end, wherein the first end is closed and wherein the shell has an exhaust opening at or near the second end, wherein wind ingested into the shell through the intake opening is forced to become a vortex having a higher speed than the ingested wind and concentrating the ingested wind substantially near the interior surface of the shell into a spiral air stream traveling toward the exhaust opening, in order to increase an amount of energy harvested by the blade from the ingested wind before the ingested wind, devoid of the amount of energy harvested, exits the shell through the exhaust opening.

20 Claims, 19 Drawing Sheets

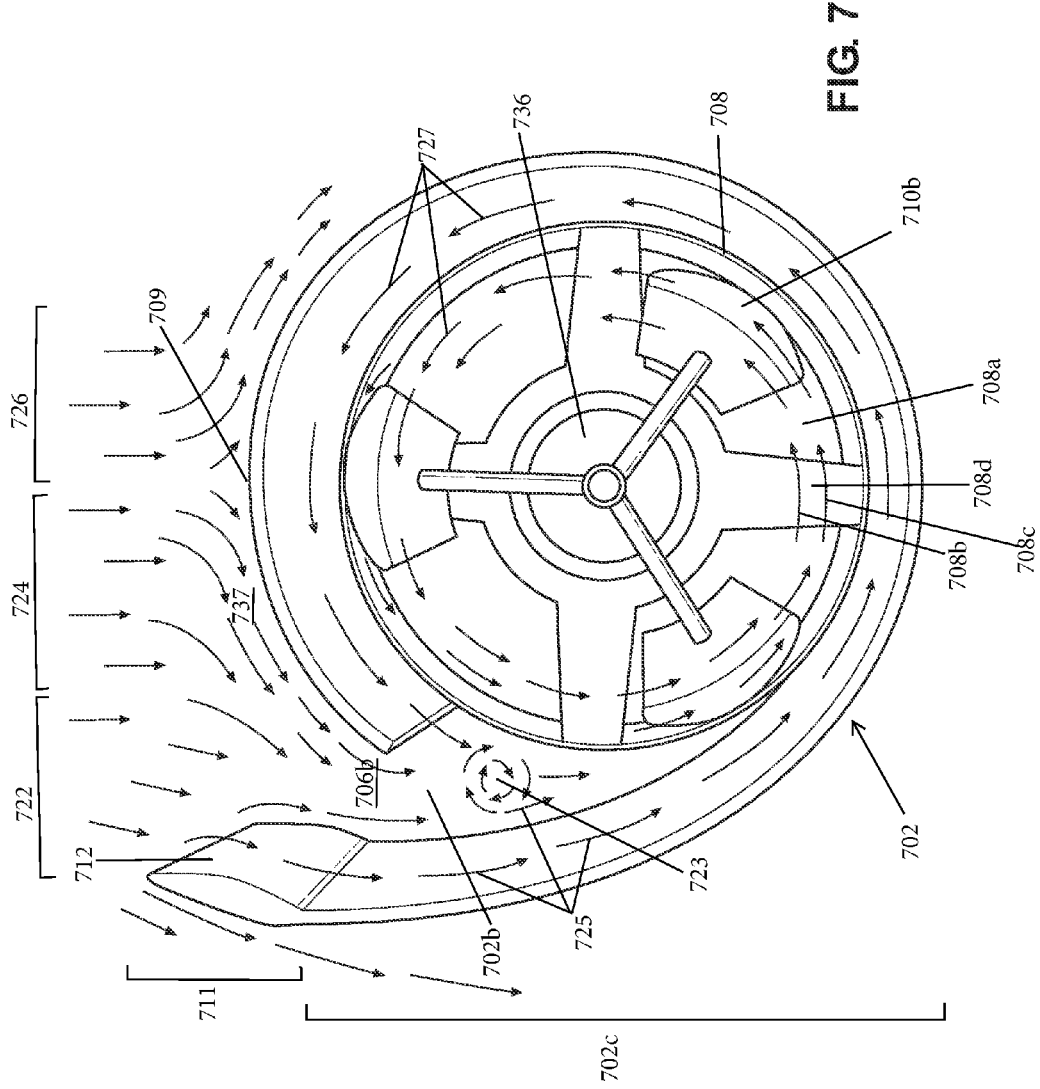

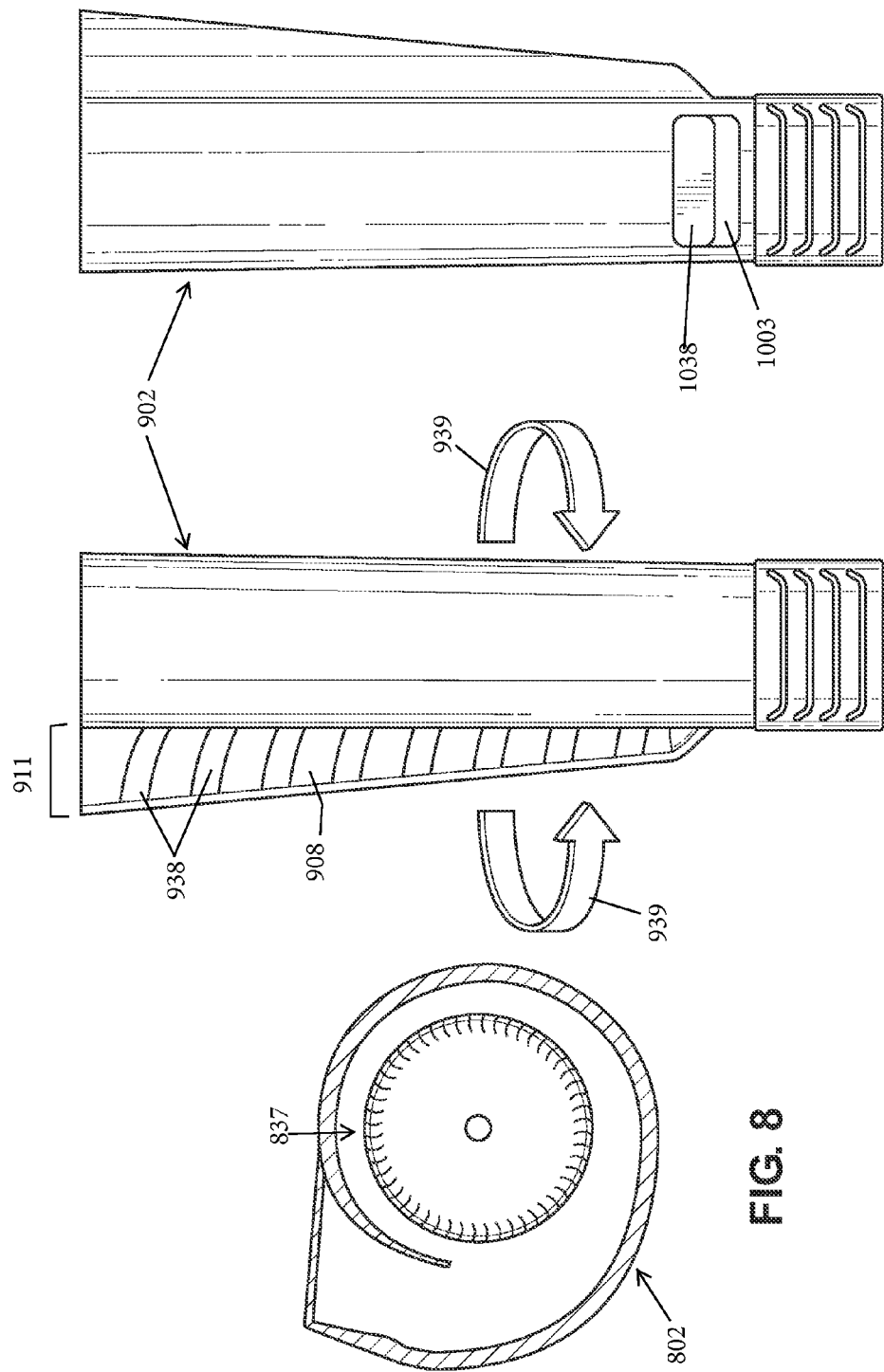

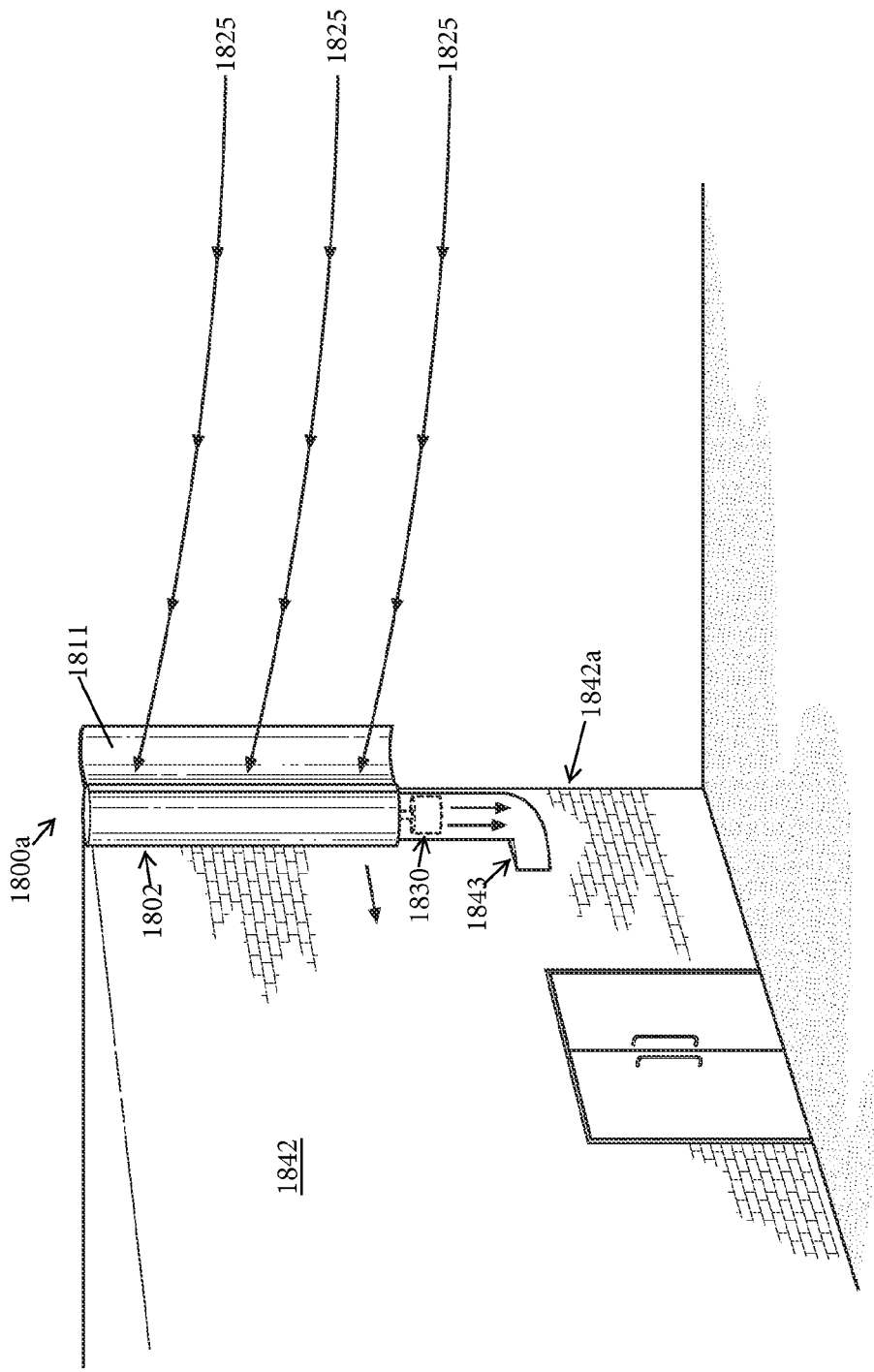

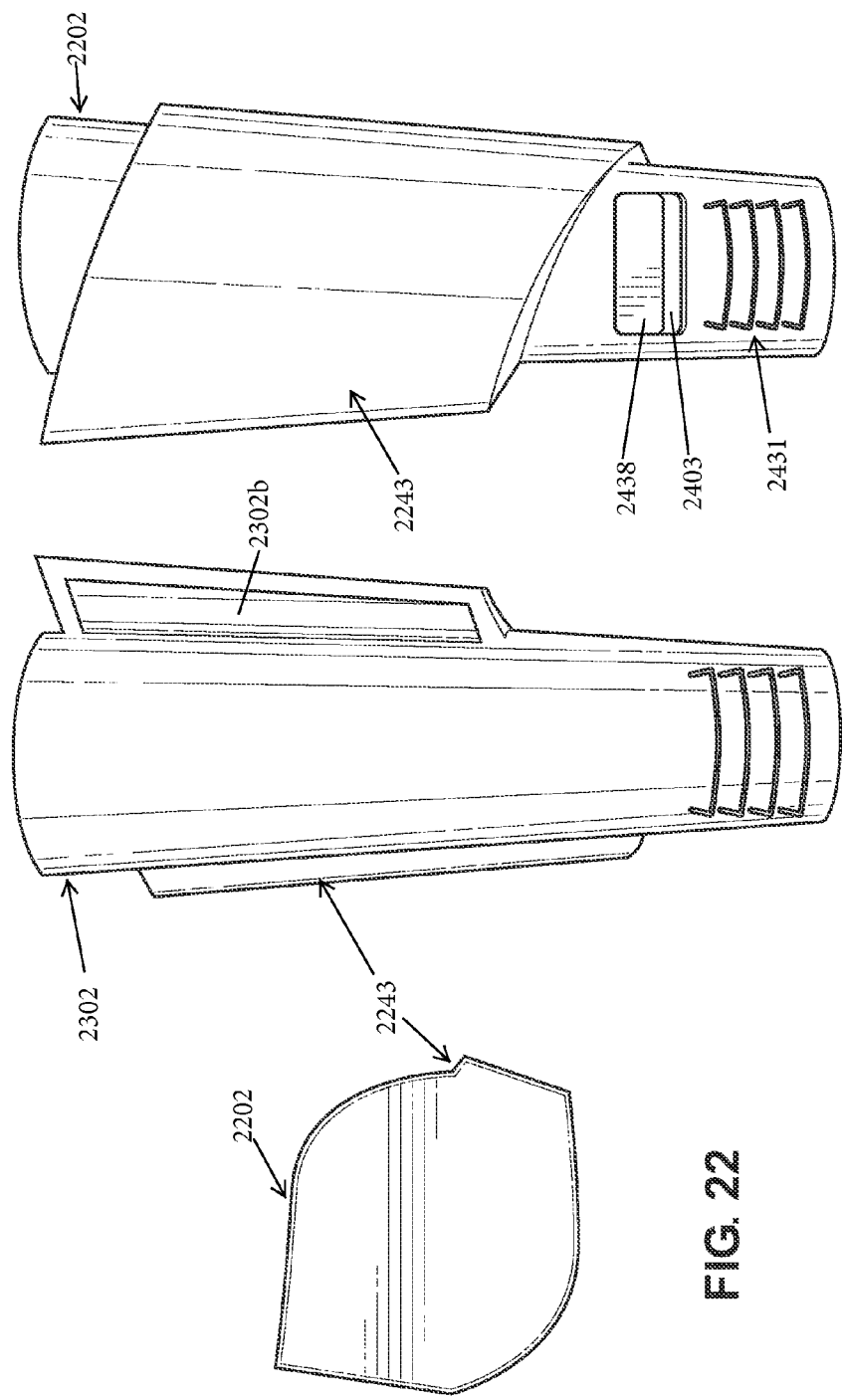

CYCLONIC AEOLIAN VORTEX TURBINE

BACKGROUND OF THE INVENTION

1. Field of the Invention

The invention relates generally to wind turbines and more particularly to methods, systems and apparatus for increasing the efficiency of wind turbines.

2. Description of the Related Art

Horizontal Wind Turbines (HWT) have several negatives, such as bird strikes, having the generator mounted high with blades, which increases maintenance costs, "blades noise" and "flicker," the flicker being caused by large HWT blades passing in front of sunlight. HWT are also known for "Ice Throws, which are large build ups of ice on the blades during winter months that can be ejected at high speed and long distances causing damage or harm to people or property. Further, because of the above drawbacks of the HWT, their placement restrictions, away from populations and homes, are currently implemented around the world.

Some of the largest Horizontal Wind Turbines have a rotor diameter of 70 m and tower height of 130 m and have experienced blade disintegration where a sheered blade debris where ejected hundreds of meters risking life a property. Moreover, sophisticated safety systems must be deployed in order to cope with wind gusts of exceptional strength.

Current Vertical Axis Wind Turbines (VAWT) are typically exposed 360 degrees to the wind making only one blade or more at the optimal efficient angle towards the direction of wind causing the remaining blades to create drag. Further, current VAWT are limited to size restrictions due to cabling and guide wires and support lattices. In addition, current VAWT are inherently unstable at higher wind speed regimes.

Vertical Axis Wind Turbines (VAWT's) of the so-called Savonius type have been conceived and deployed since the early 20th century and more recently also of the so-called Darrieus and Windside and Helical blade types. However, their significantly lower efficiency compared to traditional horizontal axis turbines has apparently restricted their use in the mini-wind turbine and microturbine arenas and rooftop wind generator industry. And apparently they are not currently considered for use in large scale Mega Watt Horizontal Axis Wind Turbine industry.

Thus, there is a need for new and improved turbines that solve the problems described above.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an exemplary embodiment a cyclonic aeolian turbine is provided, the turbine having a blade rotor encased into a cavity shell configured to increase the efficiency of the turbine. In an aspect, the shell has an intake opening that takes advantage of the Venturi effect to accelerate the wind ingested into the shell, thus increasing the energy of the ingested wind and decreasing the pressure inside the shell, thus creating a suction effect that pulls more wind into the shell.

In another aspect, the cavity shell has an airfoil that takes advantage of the Bernoulli effect to contribute to the acceleration of the ingested air and also to increase the ratio of harvested wind.

In another aspect, the shell has a substantially circular cross-section to take advantage of the Coanda effect to convert the ingested wind into a vortex that constantly approaches the blades at the optimum angle of attack.

In another aspect, the shell is configured to facilitate the formation of a natural eddy between the vortex and the laminar flow and turbulent flow, outside the path of the blades, thus preventing drag and also contributing to the suction effect.

In another aspect the shell has an exhaust portion to release pressure inside the cavity and thus ensure continuous inflow of wind through the shell intake opening.

In another aspect, the cyclonic Aeolian turbine is adapted for high wind regimes by providing an expanded leeward portion of the shell and/or by sealing a bottom portion of the shell intake opening.

In another aspect, a yaw system is provided that rotates the shell into the direction of available wind energy, so that the airfoil and shell intake opening are in optimum position for wind harvesting.

In another aspect, guiding vanes are provided on the airfoil portion of the shell to enhance the downward flow of the ingested wind and to reduce turbulence.

In another embodiment, the cyclonic Aeolian turbine can be installed vertically to replace current vertical wind turbines. In yet another embodiment, the cyclonic Aeolian turbine can be installed horizontally, such as under a bridge.

The above embodiments, aspects and advantages, as well as other embodiments, aspects and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 7 illustrates the top view of a cyclonic aeolian vortex (CAV) turbine, having the cap of the shell removed for illustration purposes and showing wind motion directions, according to an aspect of the invention.

FIG. 8 illustrates the top view of a cyclonic aeolian vortex (CAV) turbine, having the cap of the shell removed for illustration purposes, according to an aspect of the invention.

FIG. 9 illustrates a side view of a cyclonic aeolian vortex (CAV) turbine, according to an aspect of the invention.

FIG. 10 illustrates a side view of a cyclonic aeolian vortex (CAV) turbine, according to an aspect of the invention.

FIG. 18 illustrates a side perspective view of a cyclonic aeolian vortex (CAV) turbine, mounted on a building corner, according to an aspect of the invention.

FIG. 22 illustrates a top view of a cyclonic aeolian vortex (CAV) turbine, according to an aspect of the invention.

FIG. 23 illustrates a front view of the cyclonic aeolian vortex (CAV) turbine, from FIG. 22.

FIG. 24 illustrates a back view of the cyclonic aeolian vortex (CAV) turbine, from FIG. 22.

DETAILED DESCRIPTION

Figure 1:
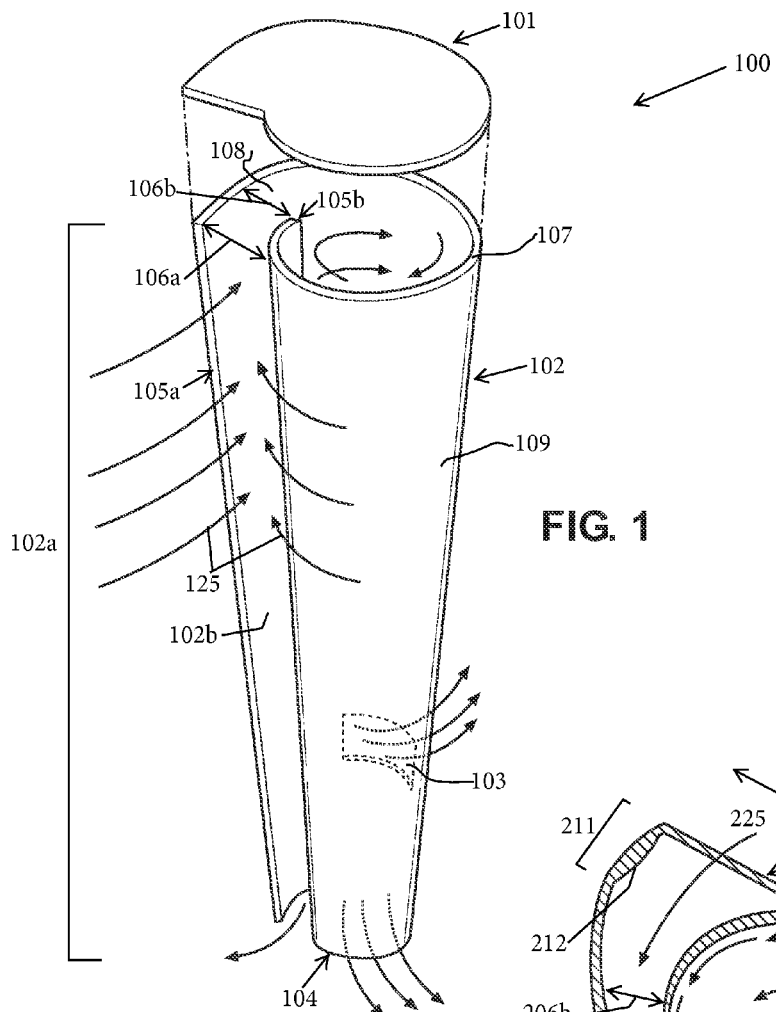
FIG. 1 illustrates a perspective view of a cyclonic aeolian vortex (CAV) turbine, having the cap of the shell lifted for illustration purposes, according to an aspect of the invention.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 102 and 202, etc.) possess the same characteristics and are subject to the same structure and function. If there is a difference between correspondingly labeled elements that is not pointed out, and this difference results in a non-corresponding structure or function of an element for a particular embodiment, then the conflicting description given for that particular embodiment shall govern.

Figure 2:
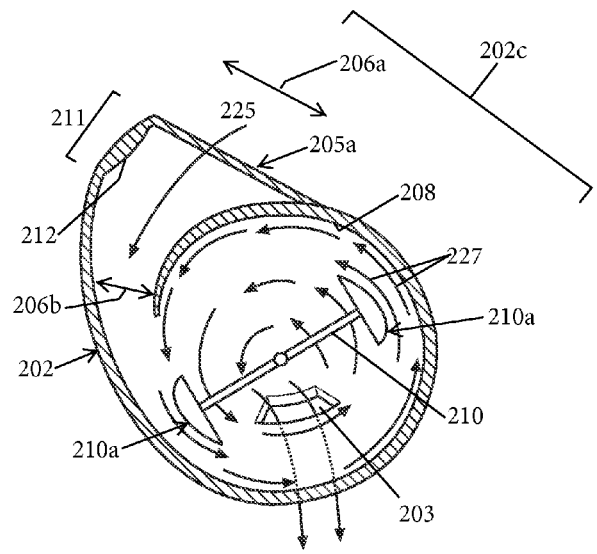
FIG. 2 illustrates the top view of a cyclonic aeolian vortex (CAV) turbine, having the cap of the shell removed for illustration purposes, according to an aspect of the invention.
Figure 3:
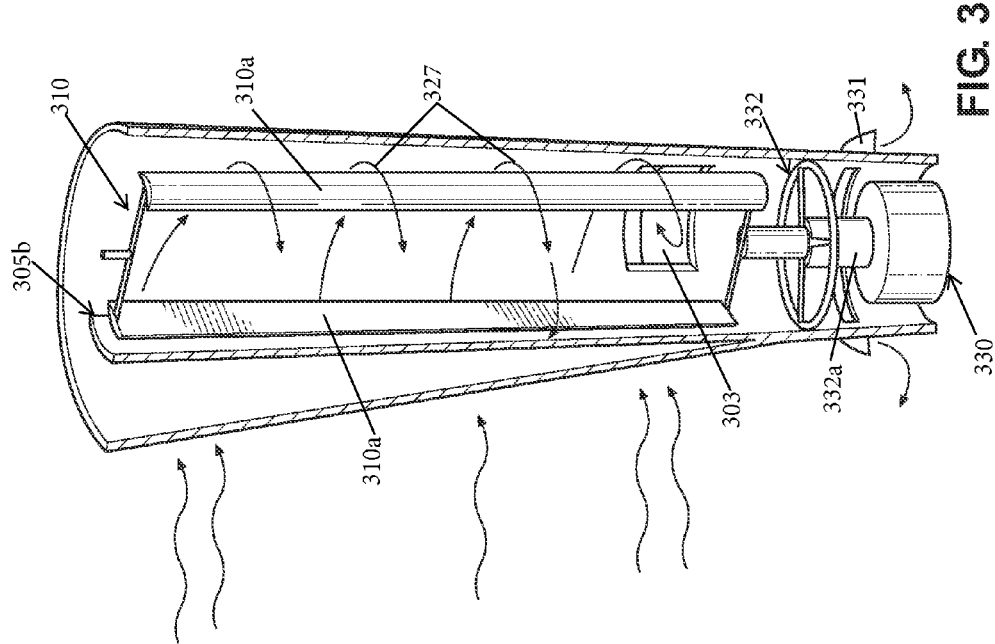
FIG. 3 shows the inside of a cyclonic aeolian vortex (CAV) turbine, according to an aspect of the invention.

Reference will now be made primarily to FIGS. 1-3. FIG. 1 illustrates a perspective view of a cyclonic aeolian vortex (CAV) turbine, having the cap of the cavity shell lifted for illustration purposes, according to an aspect of the invention. FIG. 2 illustrates the top view of a cyclonic aeolian vortex (CAV) turbine, having the cap of the shell removed for illustration purposes, according to an aspect of the invention. FIG. 3 shows the inside of a cyclonic aeolian vortex (CAV) turbine, according to an aspect of the invention.

As it will described in more details hereinafter, the CAV turbines described in this disclosure are uniquely configured to take advantage of the well-known Bernoulli, Coanda and Venturi effects in order to more efficiently harvest the kinetic energy of the winds. Briefly stated, according to the Bernoulli principle, as the speed of a fluid increases the pressure within the fluid decreases; according to the Coanda principle, a moving stream of fluid in contact with a curved surface will tend to follow the curvature of the surface rather than traveling in a straight line; and finally, the Venturi effect is the reduction of a fluid pressure when the fluid flows through a constricted section.

As shown in FIGS. 1-3, the CAV turbine 100 has a housing or shell 102/202 shaped to take advantage of the three principles stated above. In one aspect, as shown, the shell 102/202 may be a sheet (e.g., a metallic sheet) formed in a funnel-like or spiral-like shape having an intake opening 102b for its entire height/length 102a. As it can be better observed in FIG. 2, the top or cross-sectional views of the shell/housing 202 resemble a spiral or number 6 (six). It should be understood that other shapes may be adopted as long as they enable the shell 102/202 to capture the functions described herein after.

The intake opening 102b can in some applications be adjusted to open and close as to for example protect the CAV turbine in severe weather or winds by closing it, or be varied to allow more or less air to enter the turbine as needed in order to enhance a balanced and efficient flow through the blades.

As shown, the shell 102/202 is preferably defined by a top edge 107, a bottom edge 104, an outer edge 105a, an inner edge 105b and an exterior, curved and smooth, surface 109 and a corresponding interior, also curved and smooth, surface 108. The shell 102/202 also has a cap 101, which is normally secured air-tightly to the top edge 107 in order to ensure proper operation of the CAV turbine 100, namely by preventing air from the inside of shell 102 from escaping through the top of the shell. Again, only for illustration purposes, cap 101 is shown detached from top edge 107. By contrast, the bottom of the shell 102 as defined by bottom edge 104 may be open, thus permitting air from inside the shell 102 to exit thereby, as shown in FIG. 1. In addition, an exhaust opening 103 may be provided near the bottom edge 104 to supplement the exhaust area provided by the open bottom of the shell 102. The exhaust opening 103/203 may be adjustable from fully closed to fully open as needed to variably supplement the exhaust area provided by the open bottom, and thus prevent disturbances in the air flow inside shell 102.

As better seen in FIG. 2, the shell 202 may have a substantially circular portion 202c that may encase a rotor 210 (310 in FIG. 3) having for example two opposite airfoil blades 210a/310a. It should be noted that the airfoil blades 210a/310a may be curved on the outer surfaces and flat on the opposite inner surfaces to provide lift and thus cause rotation of the rotor 210/310.

It should be noted that the wind 125/225 will be normally ingested through the entire length/height 102a of opening 102b. For simplification of illustration, the ingested wind 125 is represented in FIG. 1 by curved arrows entering shell opening 102b only in the upper half of shell opening 102b. Also, as shown, the shell opening 102b may be configured such that after initially passing through a wider section 106a/206a of the shell opening 102b, the ingested wind 125/225 is forced to travel through progressively narrowing sections culminating in a constricted section 106b/206b. This configuration of the shell/housing 102/202 and its opening 102b takes advantage of the Venturi effect to increase the speed of the ingested wind 125/225, and thus its kinetic energy to be harvested, as it is forced to pass through constricted section 206b. It should be observed that the configuration of opening 102b also guides the ingested wind 125/225 towards the interior curved surface 108. This configuration takes advantage of the Coanda effect to cause at least a substantial portion of the ingested wind 125/225 to flow near the curved interior surface 108 as it seeks to exit through the open shell bottom and/or exhaust opening 103/203. Consequently, the air flow inside shell 102/202 is substantially a cyclonic/vortex/swirl/spiral-down type flow 227/327, as better seen in FIG. 3. This cyclonic air flow 227/327, having an increased speed because of the Venturi effect and following the inside curvature of the shell because of the Coanda effect, provides increased effectiveness in harvesting its kinetic energy by approaching continuously the blades 210a/310a at an optimum angle of incidence substantially for the entire length/height of the blades 210a/310a (see FIG. 3).

As better seen in FIG. 2, the cyclonic air flow 227 will provide the lift to blades 210a and thus cause the spinning of rotor 210. It should be observed that when air lift blades 210a are used, the air will travel faster over the outer curved surface of the blades 210a (thus lower pressure) and comparatively slower (thus higher pressure) near the inner flat surface of the blades 201a, causing lift of the blades.

As shown in FIG. 2, the shell 202 may have an airfoil portion 211 having a curved interior surface 212. The ingested wind 225 traveling over the curved surface 212 will increased in speed because of Bernoulli effect, thus supplementing the Venturi effect in increasing the speed of the incoming/ingested wind 225, as described above. Also because of the Bernoulli effect, the increased speed of the air inside the shell 202 translates in lower pressure inside the shell when compared with the atmospheric pressure outside the shell 202. This creates a suction effect that helps attract more wind inside the shell, thus more kinetic energy to be harvested by blades 210a becomes available. This is yet another aspect that increases the efficiency of the CAV turbines disclosed herein.

Figure 4:
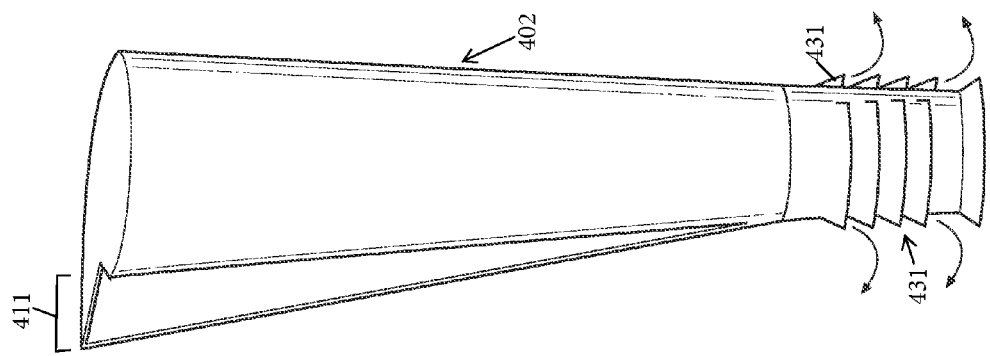
FIG. 4 illustrates a top perspective view of a cyclonic aeolian vortex (CAV) turbine, according to an aspect of the invention.

FIG. 4 illustrates a top perspective view of a cyclonic aeolian vortex (CAV) turbine, according to an aspect of the invention. As better seen in FIG. 4, the airfoil portion 411 (211 in FIG. 2) could be called a parabolic or asymmetric airfoil as it is preferably wider at the top and progressively narrower towards the bottom. This is to accommodate for the known fact that winds travel at higher speeds as height above ground increases. Thus, the airfoil 211/411 being wider at the top helps the CAV turbine collect more kinetic energy. Less kinetic energy lower in the cavity helps to induce a variable spin opposition from the higher end of the cavity receiving more energy. A higher spin rate on the blade assembly open to more wind energy that the bottom blade assembly used creates a spin differential that induces a natural vortex within the cavity/shell 102. For the same rationale, opening 102b may also be wider at the top to accept a greater amount of wind energy at higher elevations where wind energy is greater. As described herein, the cavity shell 102 may be also closed at variable levels closer to ground level as to, first, contain the steady flow of laminar wind energy as opposed to turbulent wind energy near ground level; and second, help in containing the pressure differential from outside to inside the shell; this also helps to induce a higher spin rate at the upper portion of the used blade assembly than the bottom which transversely helps in creating a natural vortex.

Furthermore, as better seen in FIG. 7, especially when the airfoil 711 extends beyond the substantially circular portion 702c of shell 702, the airfoil 711 has the additional benefit of capturing an additional quantity of the incoming wind that would otherwise be lost. It should be noted in FIG. 7 that even if the shell 702 is well oriented with the opening 702b facing the incoming wind, some of the wind is likely to be lost (see 726). It should be noted that as the incoming wind flow strikes the exterior cambered surface 709 of the housing 702, about 50% of the incoming wind (see 724) flows into the housing due at least in part to Coanda effect (see 737), is accelerated due to a naturally created phenomenon whereas a jet flow of air attaches itself to a surface and remains attached along a curved surface and gains momentum creating a low pressure zone close to the surface area and is further accelerated as it flows into the housing shell 702 as described above, while the remaining about 50% of wind energy flows around (see 726), thus being lost. Function at least in part of the amount of extension of the airfoil 711, additional wind 722 may be captured by the shell 702 that may compensate for the lost wind 726. This is another aspect that increases the efficiency of the CAV turbines disclosed herein.

Again, FIG. 7 illustrates the top view of a cyclonic aeolian vortex (CAV) turbine, having the cap of the shell removed for illustration purposes and showing wind motion directions, according to an aspect of the invention.

It should be observed in FIG. 7 that by the shell being configured to provide a distance between the intake opening and the blades typically a natural eddy 723 forms between laminar (steady flow of air) 725 and turbulent (buffeting flow of air) 727 fluid flows. The eddy 723 works such as to assist in creating a vacuum effect to pull air into cyclonic housing due to 702b. Further, the eddy 723 stabilizes the cyclonic air flow 727 and as shown is not intersected by the incoming blade path and thus does not create drag 710b. This is another beneficial aspect of the cyclonic aeolian vortex turbine described herein.

Also, it should be noted that the interior surface 708 of shell 702 functions also as a boundary of the low pressure area 708a created within the shell 702 near the interior surface 708 by the accelerated cyclonic air flow 727. In the same time a central zone area or eye of relative higher pressure 736 may typically exist near the axis of the turbine (i.e., vertical axis if the turbine is installed vertically). The relative higher pressure in the eye 736 would typically be lower than the outside atmospheric pressure as air moves fast therein as well and that in itself creates low pressure. However, being the eye 736 would contain less air movement than the low pressure zone 708a, the pressure in the eye 736 would be higher than in the low pressure zone 708a, but still lower that the exterior atmospheric pressure (this of course is true only if the blades and wind energy are at speed). An aspect of the CAV turbines disclosed herein is that, when airlifting blades are used, the cyclonic fluid flow 727 may also reduce flow turbulence within the pocket 708d of low 708c and high 708b pressure, thus increasing the efficiency of the turbine. This is because, if air lifting blades are used in the CAV turbine (see also FIG. 2 and related description), as they spin, they would create a high 708b (below blade; i.e., closer to the axis of rotation) and a low pressure zone 708c above the blade (i.e., farther from the axis of rotation), thus creating lift. Being that, while the blades are spinning inside the shell 702, the blades continue to intersect the path of the previous blade, unlike with a typical airfoil (e.g., airplane wing), the trailing pocket of the trailing blade vortices becomes nearly non-existent being that the lifting blades ride in the path of the previous one creating a "flow pocket" 708d of low pressure 708c above the blade and a higher pressure 708b below the blade.

Again, as earlier described when referring to FIGS. 1-2, the wind strikes the parabolic airfoil's 711 asymmetric/cumbered leading edge 712 and it is accelerated as it is injected into the housing 702. For better results, alignment of edge 712 should preferably be at best angle of attack for lift effect, which may be accomplished by using a yaw system described in more details below. Again, because of the narrower passage 706b, the wind is constricted, creating acceleration of ingested air, according to the Venturi effect.

It should be noted in FIG. 3 that the rotor 310 is coupled to a generator 330 such that electricity is generated when the rotor 310 spins. A yaw system 332 (see also 3132 in FIG. 31) is preferably also provided that rotates (see FIG. 31) only the housing 402 (FIG. 4) into the direction of available wind energy, so that the parabolic airfoil 411 and shell opening 102b (FIG. 1) is in optimum position for wind harvesting. The shell housing 402 rotation can be accomplished by varying configurations. Most notably, in larger applications, as with horizontal wind turbines, a yaw motor 332a (3132a in FIG. 31) may be utilized in conjunction with an anemometer to determine wind direction and rotate the shell 102/402 accordingly. Further, computer controlled yaw systems available with current turbines could be fitted into the disclosed CAV turbines as well, to account for yaw correlation in order to achieve maximum performance and efficiency. A natural fin yaw regulator (not shown) could also be used in smaller applications. Current HAWT have expensive and elaborate safety systems to brake and slow turbines in high wind conditions. The disclosed CAV turbines, namely shell 102, could simply rotate away from winds in dangerous high wind conditions without the added hardware needed in current HAWT in use today.

The shell 102 may be cylindrical (see FIG. 19), having a constant cross sectional area, thus providing a cylindrical rotor space, or, as shown for example in FIGS. 1-4, it may have any gradually decreasing diameter cross sectional area (i.e., funneled rotor space) as the interior rotor assembly leads towards the generator 330 and dampening aperture(s) 331/431 and base of rotor assembly. The type of rotor blades will preferably correspondingly have an identical constant width or a gradually decreasing width in a radial proportion for their edges of the choice blade assembly to travel unimpeded within the surrounding wind directional yawed CAV housing. When operating within a high incidence of strong winds or where applications and size dictate a stronger performance at higher altitudes, the funneled shape (e.g., FIGS. 1-4) would be advantageous due to a higher value of efficiency within strong wind speed regimes. This is because most wind energy is above ground level and obstructions such as hills houses, etc. that block wind energy and cause turbulence. Further, having a portion of the CAV shell sealed towards the bottom area 2644 for example (see also 2944 in FIG. 29) in a higher wind regime and large applications help create a natural vortex being most of the wind energy is received at higher elevations and a greater torque on the upper section of the blade assembly through the conservation of angular momentum than the lower helps in the stabilization of a natural vortex while containing the lower pressure within the funnel.

It should be noted that the open bottom of the shell and/or the exhaust opening 103/203 may be replaced with or supplemented by any other suitable means, such as the dampening apertures 331/431 shown in FIGS. 3-4. The only requirement is that the total exhaust area at any given time be preferably equal to, or greater than, the size of the shell opening 102b, for purging the pressure inside the shell quickly.

Figure 6:
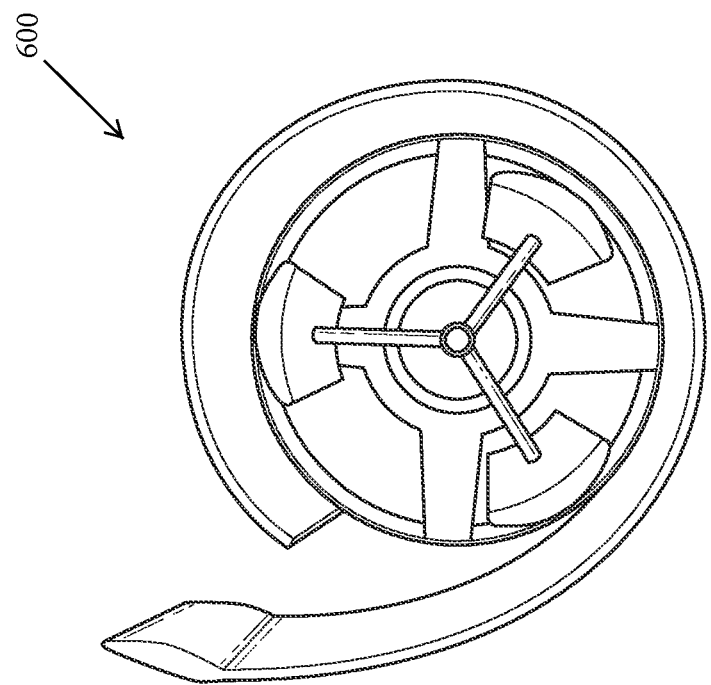
FIG. 6 illustrates the top view of a cyclonic aeolian vortex (CAV) turbine, having the cap of the shell removed for illustration purposes, according to an aspect of the invention.
Figure 5:
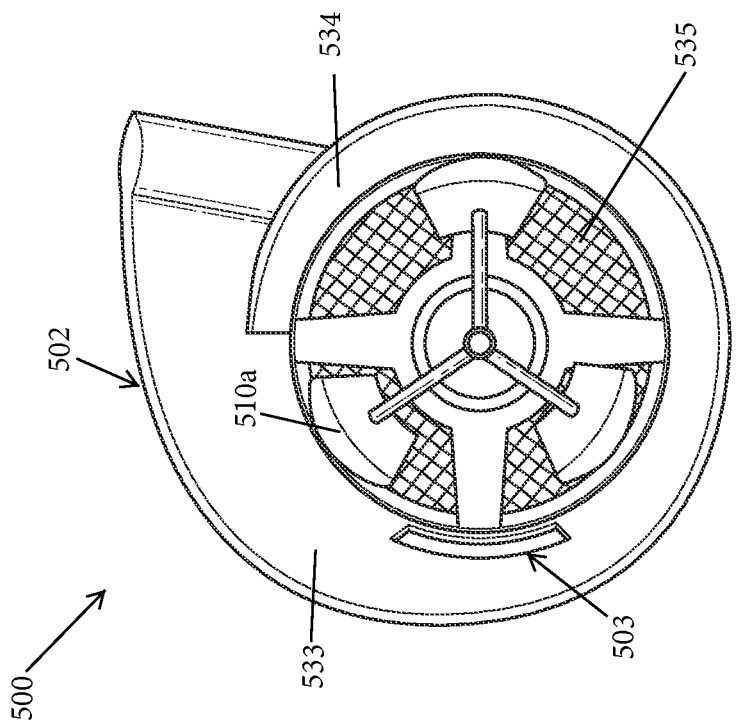
FIG. 5 illustrates the top view of a cyclonic aeolian vortex (CAV) turbine, having the cap of the shell removed for illustration purposes, according to an aspect of the invention.
Figure 13:
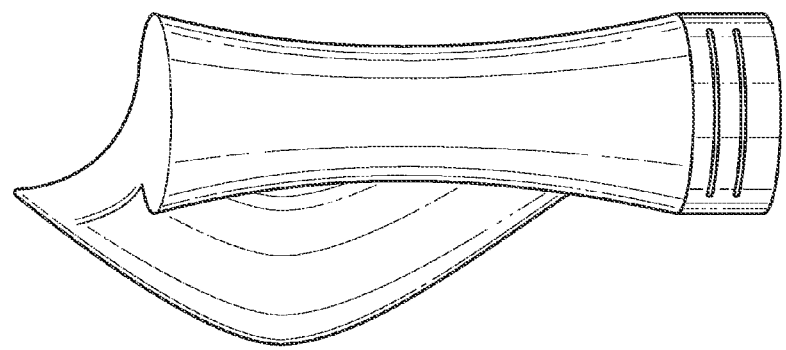
FIG. 13 illustrates a side perspective view of a cyclonic aeolian vortex (CAV) turbine, according to an aspect of the invention.
Figure 12:
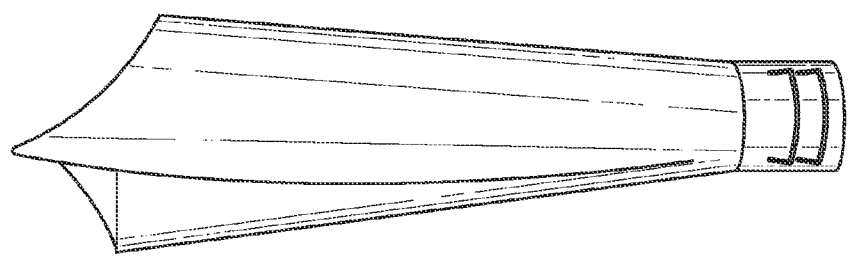
FIG. 12 illustrates a side view of a cyclonic aeolian vortex (CAV) turbine, according to an aspect of the invention.
Figure 11:
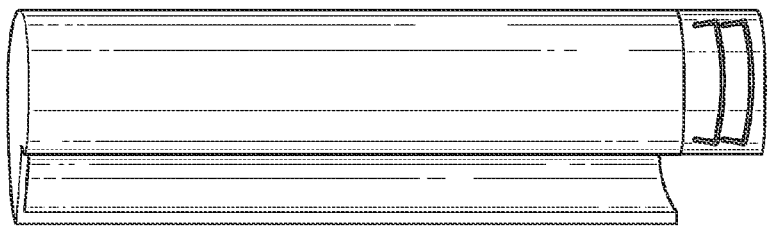
FIG. 11 illustrates a side perspective view of a cyclonic aeolian vortex (CAV) turbine, according to an aspect of the invention.
Figure 16:
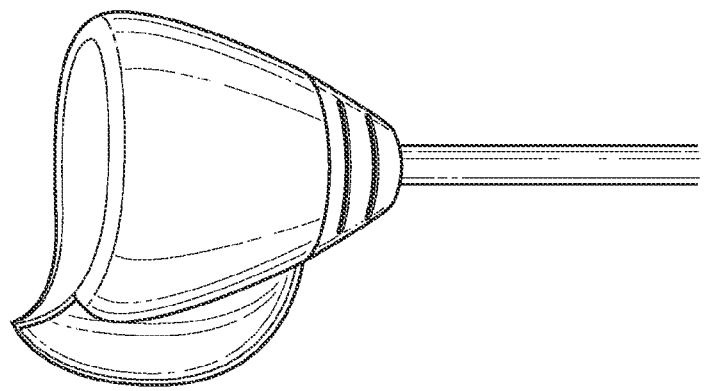
FIG. 16 illustrates a side perspective view of a cyclonic aeolian vortex (CAV) turbine, according to an aspect of the invention.
Figure 15:
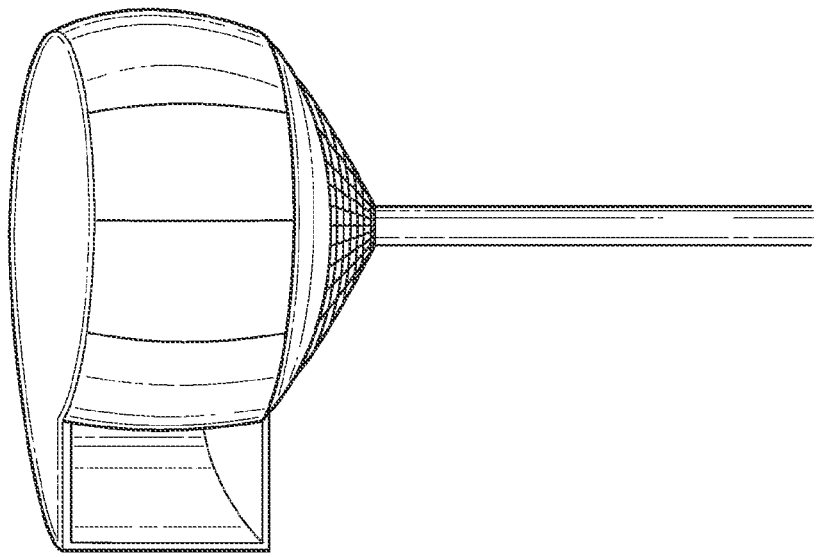
FIG. 15 illustrates a side perspective view of a cyclonic aeolian vortex (CAV) turbine, according to an aspect of the invention.
Figure 14:
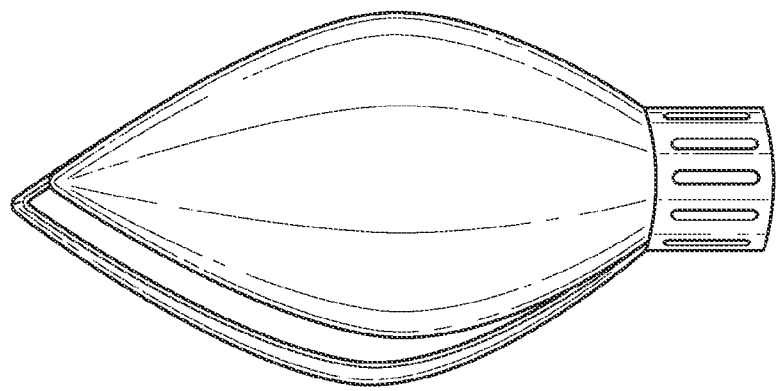
FIG. 14 illustrates a side view of a cyclonic aeolian vortex (CAV) turbine, according to an aspect of the invention.

FIG. 5 illustrates the top view of a cyclonic aeolian vortex (CAV) turbine, having the cap of the shell removed for illustration purposes, according to an aspect of the invention. FIG. 6 illustrates the top view of a cyclonic aeolian vortex (CAV) turbine, having the cap of the shell removed for illustration purposes, according to an aspect of the invention. FIG. 6 shows that the CAV turbine may have wider shell opening. This design is preferred for low wind speed regimes. It should be understood that in low energy wind applications it would be necessary to have as much wind energy enter the shell as possible, in order to have that energy for use on the chosen blade assembly. Optimally, this design would be for use in smaller CAV turbines and in areas where the wind energy is below for example 5 mph. FIGS. 5-6 show the disclosed CAV turbine using Darieus blades. However, various types of blades can be employed, such as the ones shown as examples in FIGS. 34-39.

It should be noted in FIG. 5 that the leeward side 533 of the interior of shell 502 may be wider than the windward side 534. This may be needed to compensate for the ingested wind energy and to alleviate any turbulent swirling contacting the chosen blades 510a. This configuration of the shell 502 can reduce drag on the blades 510a and thus enhance the efficiency of the CAV turbine 500. As noted earlier, the below/bottom 535 and the bottom rear exhaust 503 dampening systems are important for the CAV turbines disclosed herein to operate properly. Both exhaust openings may have a mesh screen as suggested at 535. The mesh screen helps prevent debris from passing through, out of the shell. Having or not having a mesh for debris capture at the bottom and or exhaust would depend primarily on the size of application and wind speeds that the turbine would possibly encounter. Given that there is a natural vortex created inside the shell, and with the combined increase of the wind energy, having some sort of light debris capture at the bottom or rear would be a safety device being objects could be ejected out the bottom at much higher velocities than when they enter the cavity/shell and people may be injured or property damaged without a mesh or other suitable capture means.

Further, having and being able to adjust the pressure flow of wind energy in and thru the shell during operation, by for example using a manual or automated adjustable rear exhaust 503, is essential for the efficiency of the CAV turbines disclosed.

Figure 39:
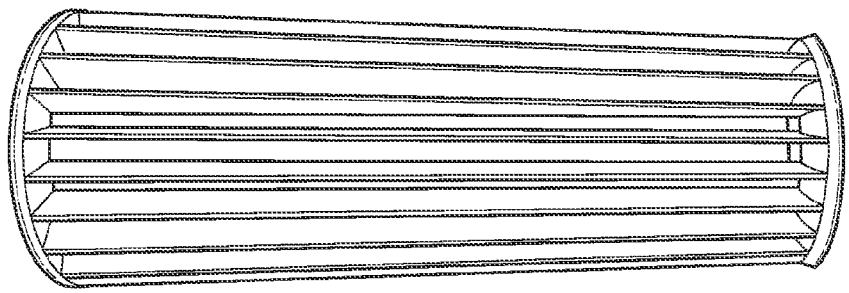
FIG. 39 illustrates a perspective view of another example of prior art blade design, which can be used in the cyclonic aeolian vortex (CAV) turbines disclosed herein.
Figure 38:
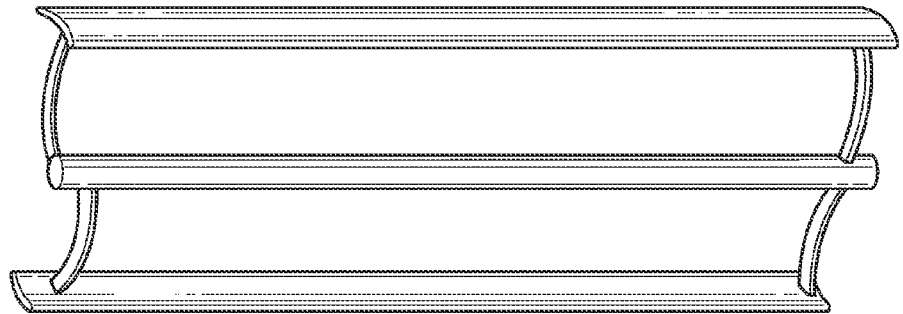
FIG. 38 illustrates a perspective view of a wind mill blade design, which can be used in the cyclonic aeolian vortex (CAV) turbines disclosed herein.
Figure 40:
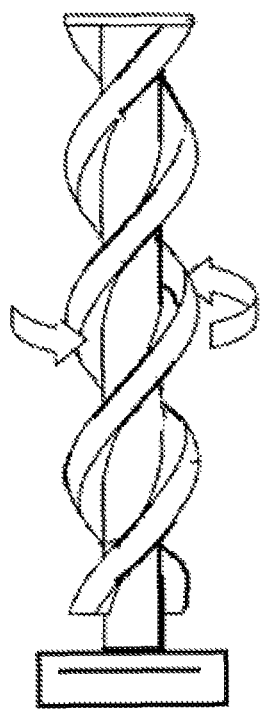
FIG. 40 illustrates a perspective view of a Magnus blade, which can be used in the cyclonic aeolian vortex (CAV) turbines disclosed herein.

FIG. 8 illustrates the top view of a cyclonic aeolian vortex (CAV) turbine, having the cap of the shell removed for illustration purposes, according to an aspect of the invention. In this CAV turbine, a centrifuge type blade 837, as shown in FIG. 39, is used. This is just an example. Again, various types of blades, such as the ones depicted in FIGS. 34-39, may be used.

FIG. 9 illustrates a side view of a cyclonic aeolian vortex (CAV) turbine, according to an aspect of the invention. FIG. 9. As shown, downward guide vanes 938 may be placed on the interior surface of shell's airfoil portion 911 while the interior surface of the shell should preferably remain smooth. The guide vanes 938 could be used to enhance the downward flow of the ingested wind energy and to reduce turbulence. Again, as suggested by arrows 939, shell 902 may be rotated using a manual or automatic yaw system in order to optimally orient the airfoil 911 and shell opening 102b (FIG. 1) toward the incoming wind.

FIG. 10 illustrates a side view, opposite to the side depicted in FIG. 9, of a cyclonic aeolian vortex (CAV) turbine, according to an aspect of the invention. Again, as earlier stated, the rear exhaust opening 1003 is preferably manually or automatically adjustable function of, for example, the pressure inside the shell 902. For example, a sliding flap 1038, manual or automatic, may be used for this purpose.

FIGS. 11-16 as well as 20-21 and 32-33 illustrate examples of alternative designs that could be used for the cyclonic aeolian vortex (CAV) turbines disclosed herein such that their aesthetic appearance is improved and/or customized, while still preserving their described functions and benefits. It should be observed, that the shell/housing can easily be designed to be aesthetically pleasing visually, such as a "sculpture," so long as the basic exterior functions described herein remain and the interior, the axis and the bottom or rear dampers and/or exiting exhaust are not impeded.

Figure 17:
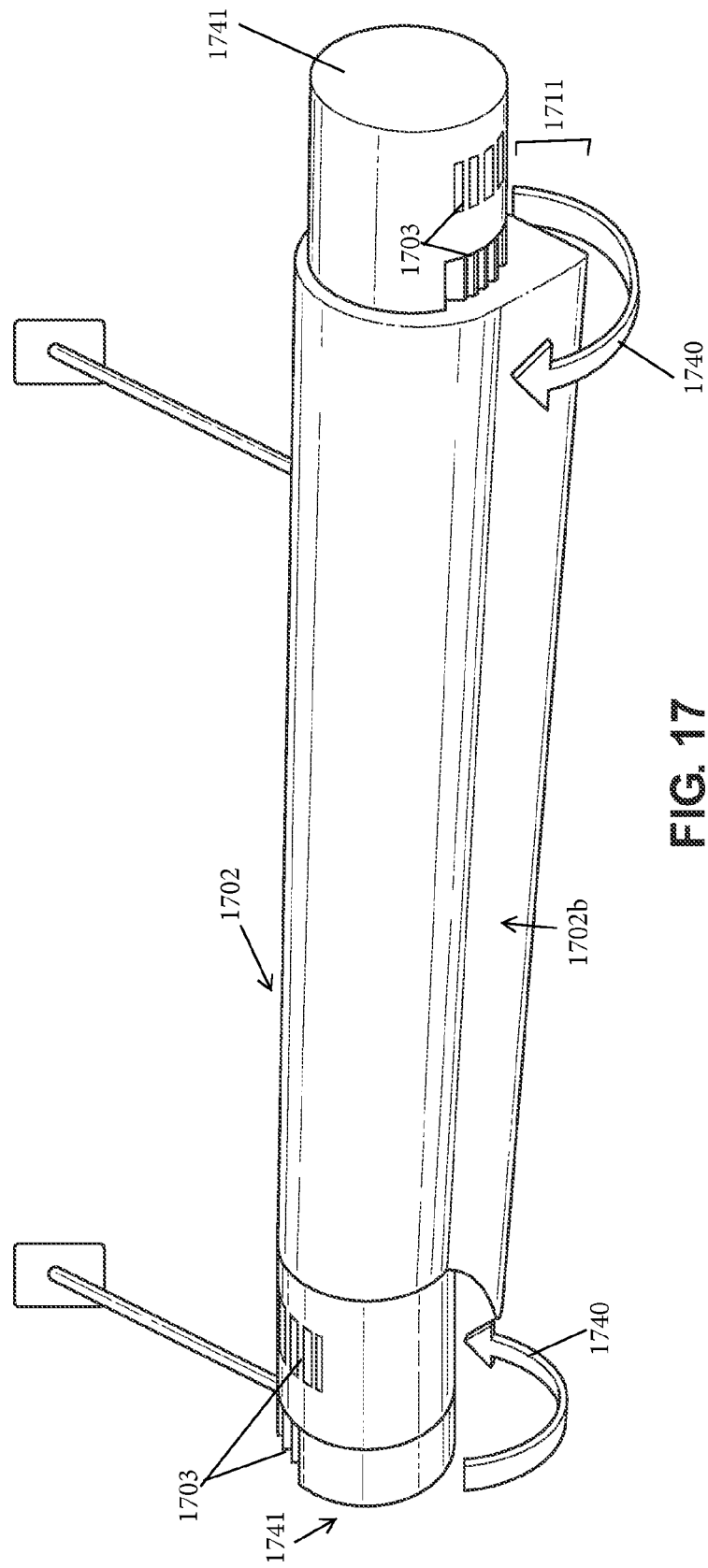
FIG. 17 illustrates a perspective view of a horizontal cyclonic aeolian vortex (CAV) turbine, according to an aspect of the invention.
Figure 21:
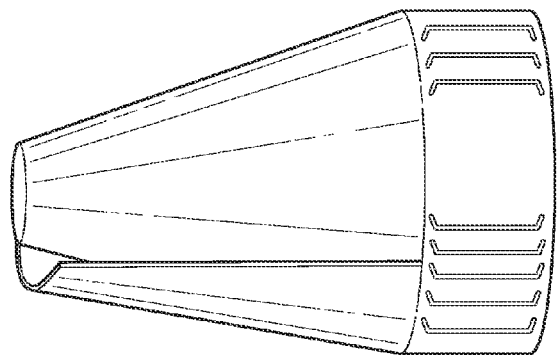
FIG. 21 illustrates a side perspective view of a cyclonic aeolian vortex (CAV) turbine, according to an aspect of the invention.
Figure 20:
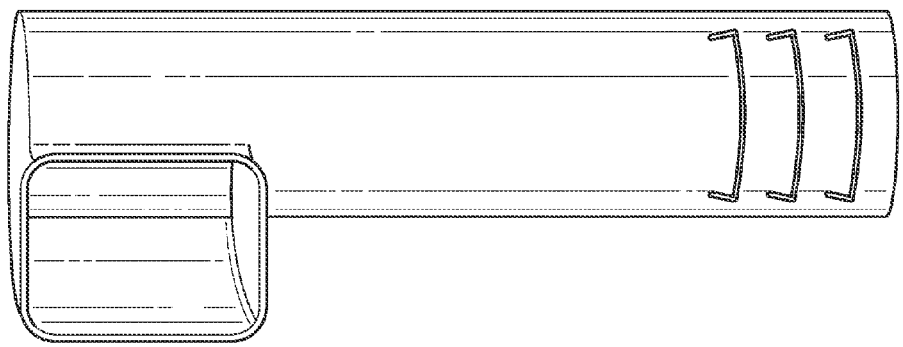
FIG. 20 illustrates a side perspective view of a cyclonic aeolian vortex (CAV) turbine, according to an aspect of the invention.

FIG. 17 illustrates a perspective view of a horizontal cyclonic aeolian vortex (CAV) turbine, according to an aspect of the invention. The CAV turbines can be mounted in various positions. For example, they me be mounted vertically as suggested by FIGS. 3-4 for example. They may also be installed horizontally as suggested in FIG. 17. Possible horizontal mounting could be under bridges or motorway overpasses to collect passing traffic kinetic wind energy; or, on top of tractor trailers for example. Horizontal CAV turbines can be more symmetrical in design being if deployed horizontally, they would have similar wind speeds on the left side as the right side. Thus, for example, the venting/exhaust openings 1703 and/or ends 1741, which may be also open to allow venting may have equal areas on the left and right side of the turbines. Similarly, as shown, the shell 1702 may be more symmetrical including the inlet shell opening 1702b and airfoil 1711. This is in contrast with the vertically mounted CAV turbines, where, as shown in FIGS. 1, 4 for example, the inlet shell opening 102b and airfoil 411 are preferably wider at the top end to account for higher winds at the top, which may be significantly higher for tall vertical turbines. As suggested by arrows 1040, the horizontal CAV turbine could spin 180 degrees into wind for optimal wind energy harvesting using also a yaw system, manual or automatic, as described earlier.

FIG. 18 illustrates a side perspective view of a cyclonic aeolian vortex (CAV) turbine, mounted on a building corner, according to an aspect of the invention. As shown, the CAV turbine disclosed herein can be adapted for installation on corners 1842a of buildings 1842 that are windward to kinetic wind energy. Again, as described in more details when referring for example to FIGS. 1-7), the wind 1825 may be drawn and/or ingested into the cavity/shell 1802 of the CAV turbine 1800a, including with the aid of airfoil 1811, to power a blade (not shown in FIG. 18) and thus a generator 1830. A bottom air exit duct 1843 may be provided for CAV turbine 1800a, as shown, which can expel the incoming air, for example horizontally as shown, due to pressure differentials.

Figure 19:
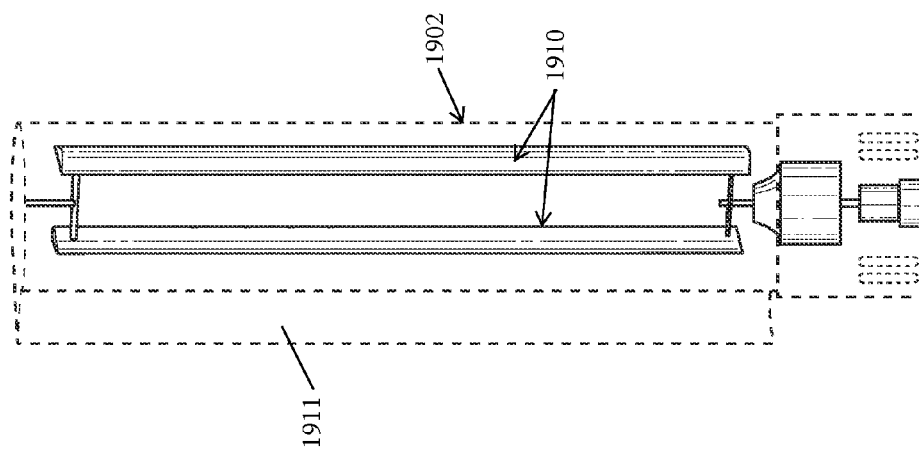
FIG. 19 illustrates a side perspective view of a cyclonic aeolian vortex (CAV) turbine, according to an aspect of the invention.

FIG. 19 illustrates a side perspective view of a cyclonic aeolian vortex (CAV) turbine, according to an aspect of the invention. Again, as stated earlier, the shell 1902 may be cylindrical cavity/shell, having a constant cross sectional area, thus providing a cylindrical rotor space for a rotor 1910 of constant width. It should be noted also that airfoil 1911 could be configured to have equal width as well, unlike the airfoil depicted in FIG. 4 for example.

FIG. 22 illustrates a top view of a cyclonic aeolian vortex (CAV) turbine, according to an aspect of the invention. FIG. 23 illustrates a front view of the cyclonic aeolian vortex (CAV) turbine, from FIG. 22. FIG. 24 illustrates a back view of the cyclonic aeolian vortex (CAV) turbine, from FIG. 22. As shown, an expanded leeward zone 2243 may be provided into the shell/housing 2202. The expanded leeward zone 2243 may be needed in higher wind regime application to compensate for high ingested wind energy and to alleviate any drag inducing turbulent swirling contacting the blades and thus enhance the efficiency of the CAV turbine. Tests showed that the expanded leeward zone 2243 helps the natural eddy 723 form outside the path of the rotating blades as to not intersect their path. And again, as an added benefit, the swirling eddy 723 helps create a natural added benefit to the suction effect of the low pressure created as the wind is accelerated as it passes the constrictions 712/725 and 706b (Venturi Effect) between the airfoil 711 and the convex outer wall that leads into the cylinder/funnel cavity/shell. It should be also noted that the shell opening 2302b may be restricted to for example a third or three fourths of the height/length of shell 2302.

Figure 27:
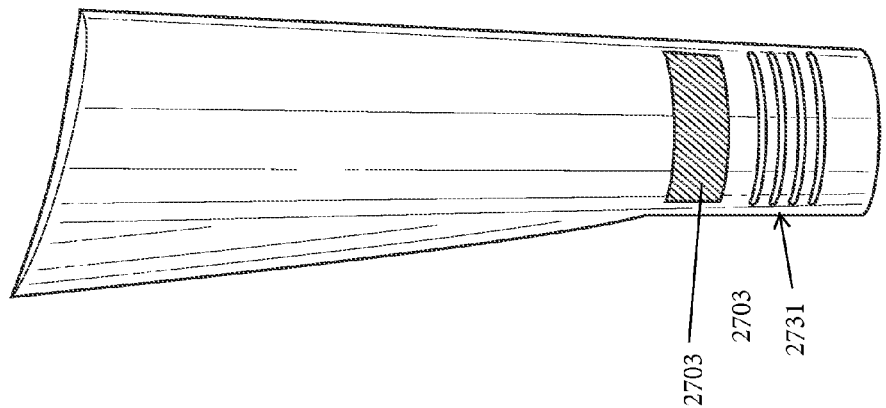
FIG. 27 illustrates a back view of the cyclonic aeolian vortex (CAV) turbine, from FIG. 25.
Figure 26:
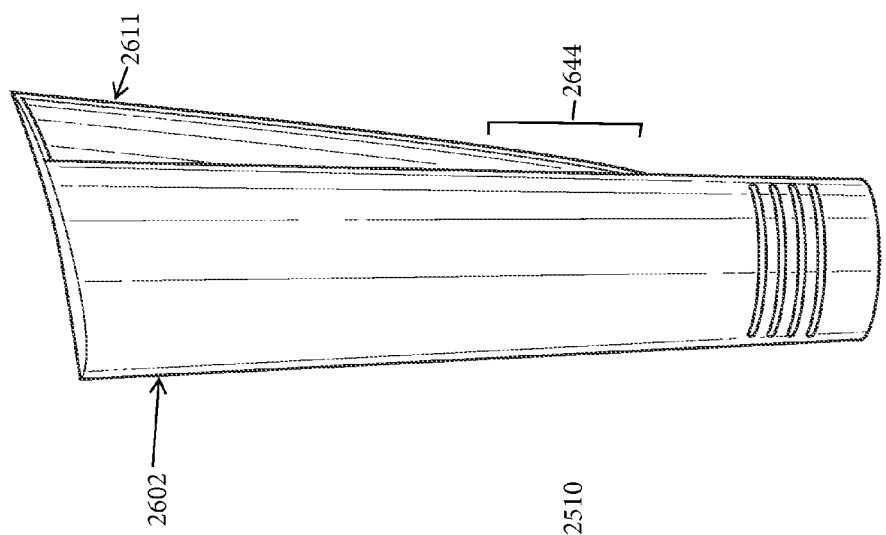
FIG. 26 illustrates a front view of the cyclonic aeolian vortex (CAV) turbine, from FIG. 25.
Figure 25:
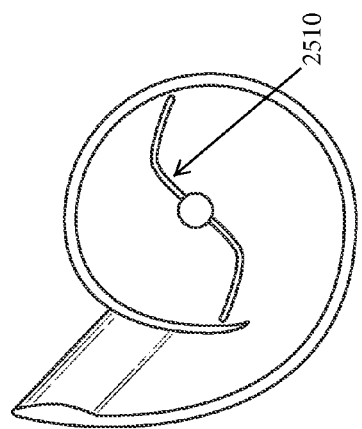
FIG. 25 illustrates a top view of a cyclonic aeolian vortex (CAV) turbine, having the cap of the shell removed for illustration purposes, according to an aspect of the invention.

FIG. 25 illustrates a top view of a cyclonic aeolian vortex (CAV) turbine, having the cap of the shell removed for illustration purposes, according to an aspect of the invention. FIG. 26 illustrates a front view of the cyclonic aeolian vortex (CAV) turbine, from FIG. 25. FIG. 27 illustrates a back view of the cyclonic aeolian vortex (CAV) turbine, from FIG. 25. FIG. 25 shows another example of rotor blade 2510 that can be used in the CAV turbines disclosed herein. The longitudinal axial flow (see 125 in FIG. 1 for example) may be constricted towards the bottom lower quarter blade area 2644 for example (see also 2944 in FIG. 29) as to contain the pressure differential. In other words, the parabolic airfoil 2611 may be sealed in variable apportioned degrees (e.g. ¼) at 2644 as to contain the pressure. Again, this configuration may be useful for larger CAV turbine models where high wind regimes can induce a pressure differential to assist in maintaining efficiency.

Figure 30:
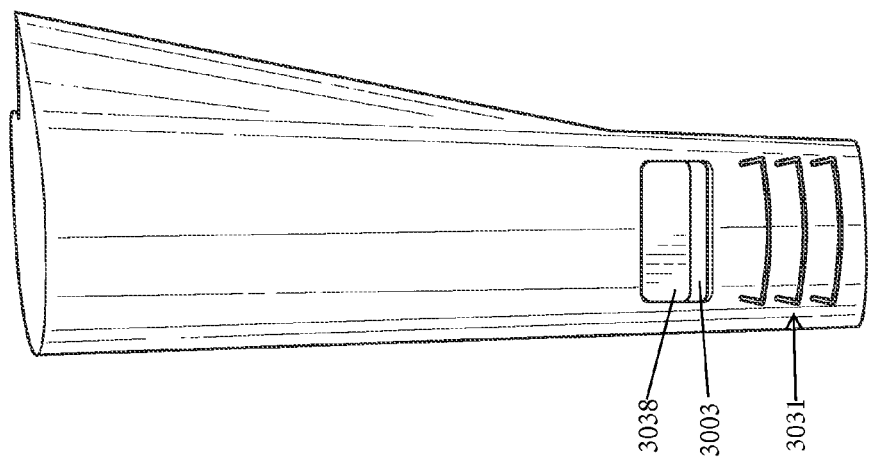
FIG. 30 illustrates a back view of the cyclonic aeolian vortex (CAV) turbine, from FIG. 28.
Figure 29:
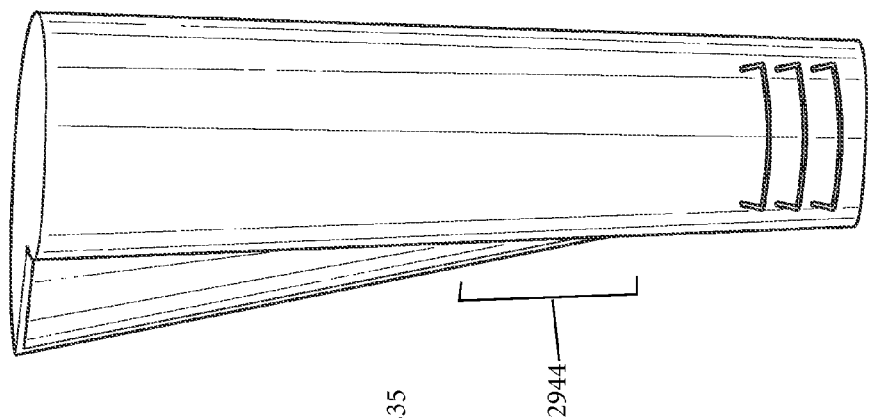
FIG. 29 illustrates a front view of the cyclonic aeolian vortex (CAV) turbine, from FIG. 28.
Figure 28:
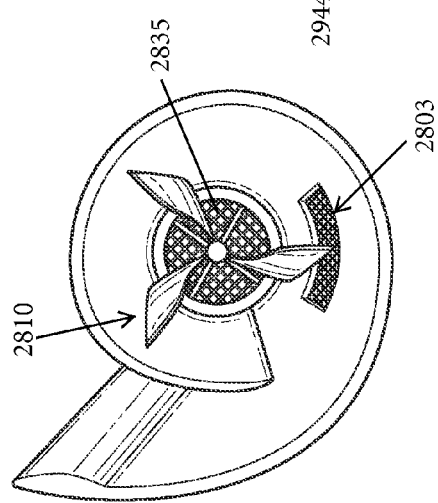
FIG. 28 illustrates a top view of a cyclonic aeolian vortex (CAV) turbine, having the cap of the shell removed for illustration purposes, according to an aspect of the invention.

FIG. 28 illustrates a top view of a cyclonic aeolian vortex (CAV) turbine, having the cap of the shell removed for illustration purposes, according to an aspect of the invention. FIG. 29 illustrates a front view of the cyclonic aeolian vortex (CAV) turbine, from FIG. 28. FIG. 30 illustrates a back view of the cyclonic aeolian vortex (CAV) turbine, from FIG. 28. FIG. 28 shows another example of rotor blade 2810 that can be used in the CAV turbines disclosed herein, namely a reversed Savonius blade. Filtered bottom exhaust 2835 and rear exhaust 2803 should also be noted. FIG. 30 shows again that the rear exhaust 3003 may be adjustable as described earlier by using for example a sliding door 3038. Additionally or alternatively dampening vents 3031 (see also 331/431 in FIGS. 3-4) may be used.

Figure 31:
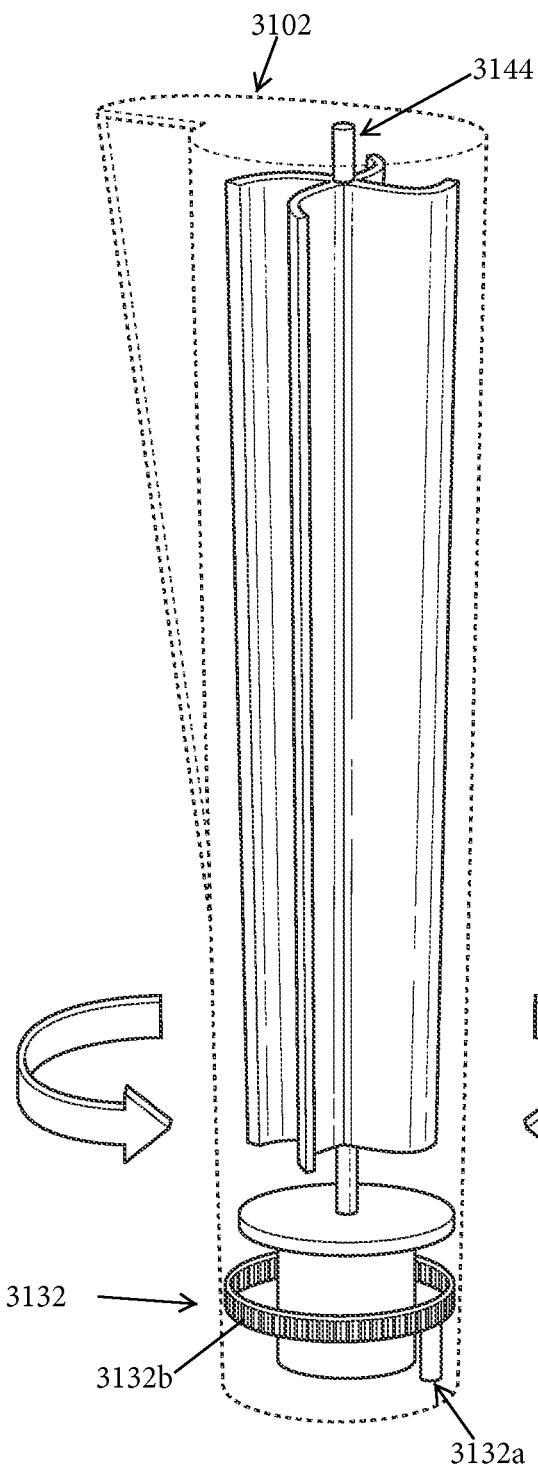
FIG. 31 illustrates a side view of a cyclonic aeolian vortex (CAV) turbine, according to an aspect of the invention.
Figure 32:
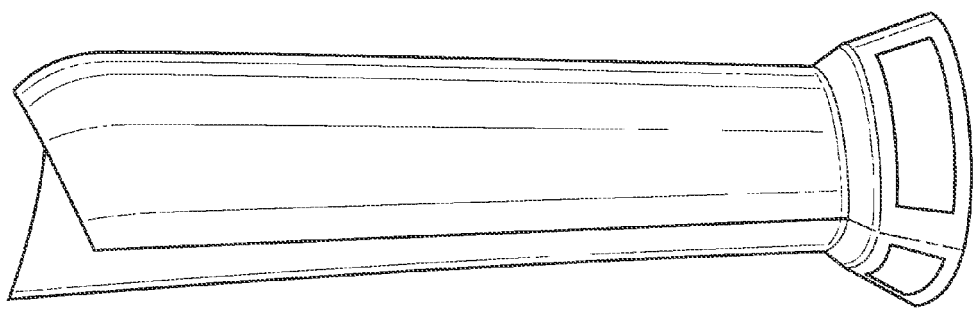
FIG. 32 illustrates a side view of a cyclonic aeolian vortex (CAV) turbine, according to an aspect of the invention.
Figure 33:
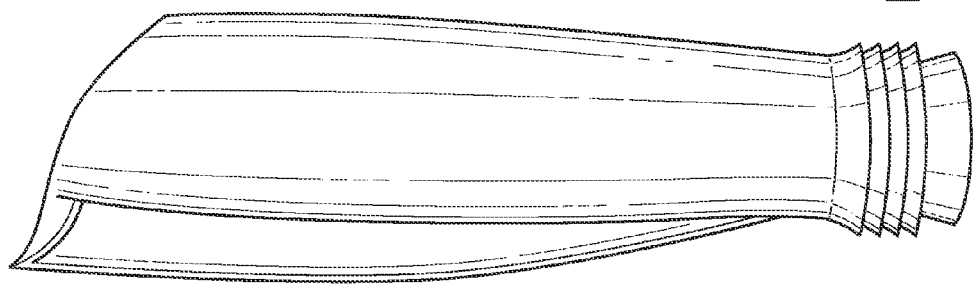
FIG. 33 illustrates a side view of a cyclonic aeolian vortex (CAV) turbine, according to an aspect of the invention.
Figure 35:
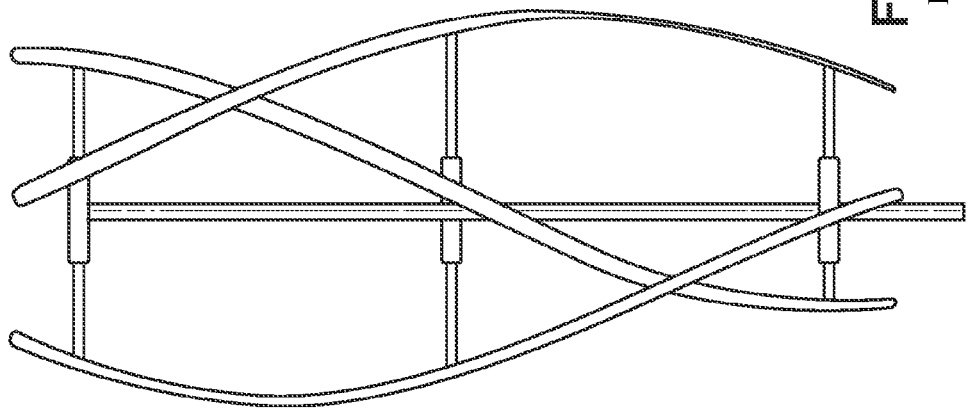
FIG. 35 illustrates a perspective view of a helical blade assembly, which can be used in the cyclonic aeolian vortex (CAV) turbines disclosed herein.
Figure 34:
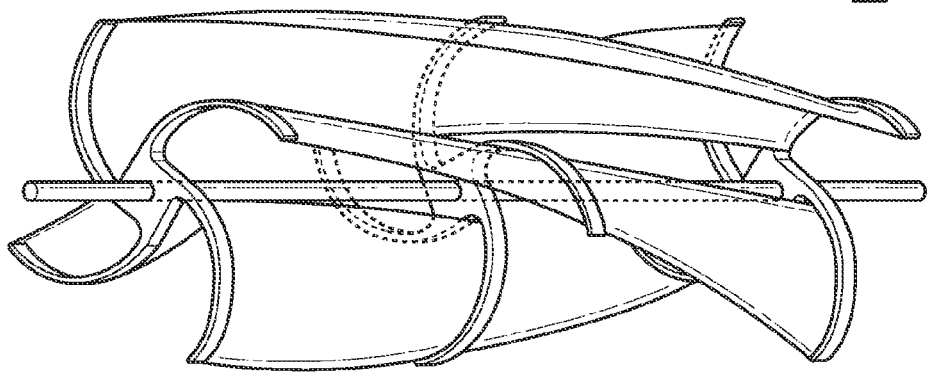
FIG. 34 illustrates a perspective view of a Savonius S-Type Helical blade, which can be used in the cyclonic aeolian vortex (CAV) turbines disclosed herein.
Figure 37:
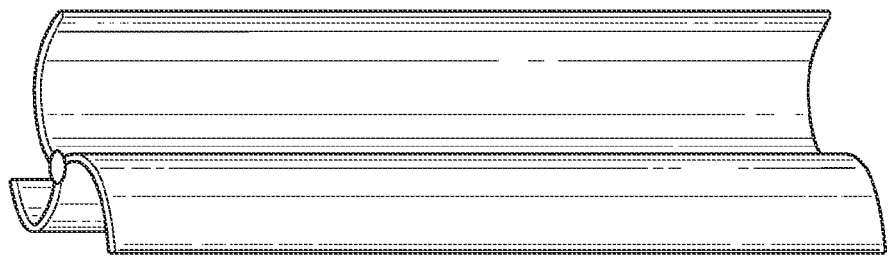
FIG. 37 illustrates a perspective view of a Savonius Push blade, which can be used in the cyclonic aeolian vortex (CAV) turbines disclosed herein.
Figure 36:
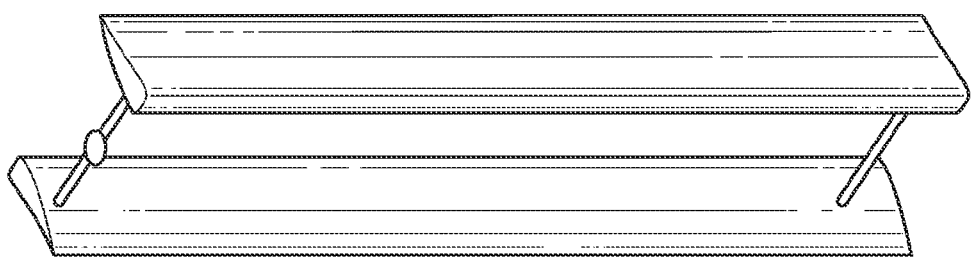
FIG. 36 illustrates a perspective view of a dual blade, which can be used in the cyclonic aeolian vortex (CAV) turbines disclosed herein.

FIG. 31 illustrates a side view of a cyclonic aeolian vortex (CAV) turbine, according to an aspect of the invention. Again, as pointed out earlier, a yaw system 3132 may be provided to spin shell/housing 3102 into the direction of the incoming wind energy. The yaw system may comprise as shown a motor 3132a and teeth 3132b to accomplish the yaw. The blade shaft 3144 can be ran axially and attached at top and bottom of shell 3102 dependent upon the blade type used and expected torque limits and also upon type of implementation (e.g., high wind regimes). This configuration gives the CAV turbine a much higher tolerance to the centrifugal forces that have plagued current vertical axis wind turbines due to structural wires and lattices needed to brace them from centrifugal stresses and/or Coriolis effect. Also, it should be noted that the Coriolis Effect is subdued by the existence of the shell housing 3102.

FIGS. 34-40 illustrate examples of prior art blade designs, which can be used in the cyclonic aeolian vortex (CAV) turbines disclosed herein. Again, these are examples only. Various other blade designs may be used without departing from the scope of the invention(s) disclosed herein. The blade type and angle for intercepted wind would depend on the task, environment size and where the turbine will be placed. The CAV turbines disclosed herein can accept rotors with symmetrical and or asymmetrical air foil blade(s) or rotors with one or with a plurality of blades. The blades can for example be Darrieus with a linear or of helical design and H-Type Blade, Savonius or helical turbine type blade, with the rotor and stator assembly designed in such a way as it enhances the lift thrust and rotation by sheer shape to the attached blades used. As another example, the Spiral Magnus blade can also be employed within the cavity housing.

The combined blade rotor assembly may have the ability to adjust for pitch control as seen currently in horizontal wind turbines. The pitch control system could be deployed in the CAV turbines disclosed herein being the kinetic ingested wind energy is being negotiating around the shell's cylindrical interior housing in a cyclonic manner and adjustments to blade pitch for best angle of attack would improve efficiency further. Magnetic levitation technology as to reduce friction and enable higher RPM speeds and slower wind energy starts could also be employed.

Again, as stated, earlier, current Vertical Axis Wind Turbines (VAWT) are typically exposed 360 degrees to the wind making only one blade or more at the optimal efficient angle towards the direction of wind causing the remaining blades to create drag. In one aspect, the CAV turbines solve this issue by forcing the wind energy into a vortex as to strike the internal blades at the optimum angle. Further, the housing shell of this invention protects the internal blades from being subjugated to wear from harsh weather.

The asymmetric cowling/shell/housing strongly supports the vertical axis blades (when CAV turbine is installed vertically) from asymmetrical stresses and thus facilitates the use of larger VAWT blades without guide wires and support cables as typical with current VAWT's. Current VAWT are limited to size restrictions due to cabling and guide wires and support lattices.

Bird strikes as seen in horizontal wind turbines would be all but eliminated. Being that, when CAV turbine is installed vertically, the electrical generator is at the base of the CAV turbine, the costs to maintain would be far lower than current Horizontal Wind Turbines, which have the generator mounted high with blades.

Again, some of the current drawbacks of Horizontal Wind Turbines are "blades noise" and "flicker," the flicker being caused by large Horizontal Wind Turbines blades passing in front of sunlight and large blade rotation noise. Both are resolved by the disclosed CAV turbines being the blades are encased inside the shell and sunlight cannot pass through, so there are no "flicker" issues.

As stated earlier, Horizontal Wind Turbines are known to have caused "ice throws," which are large buildups of ice on the blades during winter months, which can be ejected at high speed and long distances causing damage or harm to people or property. Placement restrictions of current Horizontal Wind Turbines from populations and homes are currently implemented around the world. The CAV turbines disclose solve this by having the blades internally.

In large applications, when the CAV turbines are installed vertically, the top could be used as a mast for communications, weather observing equipment, solar panels etc.

It should be also noted that, given that the CAV turbines operation is internal by design, they could be used discreetly in part of a built, for example in building façade or piping or poles, making the practically invisible.

Again, some of the largest Horizontal Wind Turbines have a rotor diameter of 70 m and tower height of 130 m and experienced blade disintegration where a sheered blade debris were ejected hundreds of meters, risking life a property. Being that in the CAV turbines the shell cavity shields the internal structure and blades, in case of catastrophic failure, the shell would contain the debris caused by the catastrophic failure of practically any blade assembly, and thus, prevent injuries to people or property.

Moreover, in current wind turbines, sophisticated safety systems must be deployed in order to cope with wind gusts of exceptional strength. The CAV turbines disclosed solve that problem simply by having a regulated ingested wind entry system and exiting dampers that can purge the pressure, and/or by turning away the shell's opening in extreme wind conditions.

It should be noted also that, due to the significantly improved blade efficiency of the CAV turbines described herein, they could be smaller in size than current VAWTs for the same amount of power. That could reduce for example manufacturing, installation and maintenance costs.

Current VAWT are inherently unstable at higher wind speed regimes. The disclosed CAV turbines, by design as described, can manage and harvest wind energy at much higher wind speeds than current VAWTs due to the gyroscopically radial load distribution of the housings shell and attachments to the rotor assembly.

Again, as described in more detail earlier in this disclosure, the use of an outer asymmetric cowling/shell/housing to encase wind turbines induces a natural wind concentrator vortex by making use of natural forces of the Coanda, Bernoulli and Venturi effects (Wind Concentrators), and thus significantly increasing the efficiency of the disclosed CAV turbines. Together, these effects, by use of the outer housing shell, create a natural centrifugal vortex fluid flow as to strike all blades at the optimum angles or trajectory for increased efficiency. By contrast, a drawback of current VAWTs is that not all the blades are acting efficiently in the direction of the fluid flow; thus if more than one blade is used only one blade of the plurality of blades will be acting efficiently.

Again, as the speed of the fluid (i.e., air) over the curved surface of the outer shell increases by way of Bernoulli Effect and adheres to the curved surface of the outer shell by way of Coanda Effect, the pressure of the fluid will decrease as it then passes through the constricted entrance or pathway of the housing shell towards the inner circular chamber, and thus, there is a pressure differential between the atmosphere outside the shell being nominal and inside the shell being lower pressure. However, the pressure differential is not needed for this invention to operate at lower fluid flow speeds whereas the pressure differential is nominal from inside the cyclonic Aeolian vortex shells housing than out and the vertical wind blades will still function. This natural effect along with the circular curved housing shell causes a vortex effect. The vortex aligns the fluid "Air" to the internal blade system. A lifting blade Darreius H-Type blade or similar lifting or push blade could be used and would have lift and push flow over all blades due to the naturally formed vortex.

Again, in an aspect, the purpose is to guide the fluid flow (Wind Energy) internally at a constant angle of incidence to the optimum blade configuration inside the rotor space and have the plurality of blades with as little to no drag to achieve efficiency not seem in current vertical axis turbines. By combining the Bernoulli, Coanda and Venturi effects to work together for obtaining an optimum angle of attack to blade(s) and a naturally created pressure differential for suction, the CAV turbines disclosed herein achieve efficiency not seen in vertical wind turbines today.

Thus, with the disclosed CAV turbines, a greater amount of the available kinetic wind energy is sustained naturally within the enclosure/shell, thus a greater efficiency and spin of the rotor assembly is obtained. The rotor blades have a cross sectional airfoil profile adapted to exploit a thrust onto the blade surface that is stricken by contiguously injected and substantially accelerated air stream, regularly distributed around the whole circumference, as well as an aerodynamic lift force by the circular motion of the air in the rotor space and even a further push by the downward-biased motion component of the swirling air stream.

In view of the fact that in the CAV turbine disclosed herein the air acts mostly on the part of the blades farthest from the axis of rotation (central axial shaft), and that the tangential speed of the air decreases in approaching the axis of rotation toward the eye of the vortex created within the shell housing to being practically null, it is not necessary for the blades to extend as far as the shaft, especially if a Savionous type rotor blade assembly is used.

In an aspect, under most adapted conditions, the CAV turbine disclosed is uniquely different from common Vertical Axis Wind Turbines (VAWTs), in that the Betz's assumption of absence of sideway dispersion of the idealized axial kinetic wind stream is substantially met. Air that misses the impact with a blade upon entry into the interior rotor space does not escape but remains within the radius of actionable use of the rotor blades to help in harvesting the kinetic energy available into useable mechanical energy by accompanying them in their rotation, while descending toward the rotor space, to the exterior with a spiraling motion, the axial speed of which is given by the vertical component of the velocity of the injection of the air into the rotor space and inevitably drawn down to the exhaust dampening aspiration vents either through the conceptualized open base or rear aperture, back into the atmosphere.

Ingested and aspirated incoming air thrust on blades for an aerodynamic lift effect on the blades. This attendant additional contribution to the convertible power compensates for the kinetic energy of discharged air not absorbed by the rotor and thence still having a residual swirl and axial velocity components, by exerting a vacuum effect that accelerates wind air collected by the wind turbine.

It may be advantageous to set forth definitions of certain words and phrases used in this patent document. Additional definitions are set forth throughout the detailed description. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the described methods. Acts, elements and features discussed only in connection with one embodiment are not intended to be excluded from a similar role in other embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A wind turbine comprising a blade rotor having one or more blades and being encased into a substantially circular portion of a shell, the shell having an interior curved surface, an exterior surface, a first end, an opposite second end, and an inward narrowing intake opening between the first and the second end, wherein the shell has an airfoil on a side of the intake opening that increases an amount of the ingested wind by capturing a portion of a wind outside the shell that would otherwise escape the intake opening of the shell, wherein the first end is closed and wherein the shell has an exhaust opening at or near the second end, wherein wind ingested into the shell through the inward narrowing intake opening is forced to become a vortex having a higher speed than the ingested wind and concentrating the ingested wind substantially near the interior curved surface of the shell into a spiral air stream traveling toward the exhaust opening, in order to increase an amount of energy harvested by the one or more blades from the ingested wind before the ingested wind, devoid of the amount of energy harvested, exits the shell through the exhaust opening.

2. The wind turbine of claim 1, wherein the vortex is obtained by combining Venturi, Bernoulli and Coanda Effects.

3. The wind turbine of claim 2, wherein the increase of the amount of energy harvested by the one or more blades is achieved by the vortex approaching each of the one or more blades at an angle of attack that reduces drag.

4. The wind turbine of claim 3, wherein the higher speed of the vortex causes a pressure inside the shell to be lower than an atmospheric pressure outside the shell, thus causing a suction effect that draws more wind into the shell.

5. The wind turbine of claim 4, wherein the shell is configured to provide a distance between the intake opening and the one or more blades to facilitate the formation of a natural eddy between the vortex and a laminar flow of the ingested wind, outside the path of the one or more blades, thus preventing drag and also contributing to the suction effect.

6. The wind turbine of claim 2, wherein the increase of the amount of energy harvested by the one or more blades is achieved by the shell causing ingested wind that misses an impact with the one or more blades not to escape but remains within a radius of actionable use of the one or more blades by accompanying them in their rotation, while traveling toward the exhaust opening.

7. The wind turbine of claim 1, wherein the one or more blades are lift blades and wherein a flow pocket of reduced turbulence is created between a high pressure zone and an opposite low pressure zone that creates lift of the lift blades.

8. The wind turbine of claim 1, wherein the airfoil has a cambered portion that takes advantage of the Bernoulli Effect to contribute to the acceleration of the ingested wind.

9. The wind turbine of claim 8, wherein, when the wind turbine is installed as a vertical wind turbine, the airfoil, as well as the shell and correspondingly the rotor blade, are wider at the top to take advantage of higher wind speeds thereby.

10. The wind turbine of claim 1, wherein, on a side of the airfoil facing the intake opening, the airfoil has guiding vanes to enhance a downward flow of the ingested wind and to reduce turbulence.

11. The wind turbine of claim 1, wherein the wind turbine is adapted for high wind regimes by providing an expanded leeward portion of the shell.

12. The wind turbine of claim 1, wherein the wind turbine is adapted for high wind regimes by sealing a bottom portion of the shell intake opening.

13. The wind turbine of claim 1, further comprising a yaw system that rotates the shell into the direction of available wind energy, so that the airfoil and shell intake opening are in an optimum position for wind harvesting.

14. The wind turbine of claim 1, wherein the exterior surface of the shell is curved near the intake opening such that to guide at least a portion of an approaching wind toward the intake opening due to Coanda Effect, and also increase the speed of the guided wind portion, while traveling towards the intake opening, due to Bernoulli Effect.

15. The wind turbine of claim 1, wherein the wind turbine is adapted for mounting as a vertical wind turbine.

16. The wind turbine of claim 1, wherein the wind turbine is adapted for mounting on the corner of a building.

17. The wind turbine of claim 1, wherein a cross-sectional view of the shell resembles number six.

18. A wind turbine comprising a blade rotor having one or more blades and being encased into a substantially circular portion of a shell, the shell having an interior curved surface, an exterior surface, a first end, an opposite second end, and an inward narrowing intake opening between the first and the second end, a first exhaust opening at or near the first end and a second exhaust opening at or near the second end, wherein the shell has an airfoil on a side of the intake opening that increases an amount of the ingested wind by capturing a portion of a wind outside the shell that would otherwise escape the intake opening of the shell, wherein wind ingested into the shell through the inward narrowing intake opening is forced to become a vortex having a higher speed than the ingested wind and concentrating the ingested wind substantially near the interior curved surface of the shell into a spiral air stream traveling toward the first or the second exhaust opening, in order to increase an amount of energy harvested by the one or more blades from the ingested wind before the ingested wind, devoid of the amount of energy harvested, exits the shell through the exhaust opening.

19. The wind turbine of claim 18, wherein the vortex is obtained by combining Venturi, Bernoulli and Coanda Effects.

20. The wind turbine of claim 18, wherein the wind turbine is adapted for mounting under a bridge.

* * * * *